United States Patent [19]

Chen

[11] Patent Number: 4,786,304

[45] Date of Patent: Nov. 22, 1988

[54] COMPOSITE MOLDING PROCESS

[75] Inventor: Otis Y. Chen, West Hartford, Conn.

[73] Assignee: United Technologies Corporation, Hartford, Conn.

[21] Appl. No.: 83,348

[22] Filed: Aug. 10, 1987

[51] Int. Cl.⁴ .......................... C03C 25/00; B32B 5/02
[52] U.S. Cl. ..................................... 65/18.1; 65/18.4;
    264/328.8; 264/328.18; 264/332; 264/261;
    264/257
[58] Field of Search ......................... 65/18.1, 18.4, 3.2;
    264/328.8, 328.18, 332, 335, 257, 261, 262;
    501/88, 93, 99

[56] References Cited

U.S. PATENT DOCUMENTS

| | | | |
|---|---|---|---|
| 4,312,687 | 1/1982 | Sigworth | 264/262 X |
| 4,314,852 | 2/1982 | Brennan et al. | 501/88 |
| 4,324,843 | 4/1982 | Brennan et al. | 428/697 |
| 4,415,391 | 11/1983 | Reid | 264/257 X |
| 4,428,763 | 1/1984 | Layden | 65/4.21 |
| 4,464,192 | 8/1984 | Layden et al. | 65/18.1 |
| 4,483,214 | 11/1984 | Mayer | 264/257 X |
| 4,560,523 | 12/1985 | Plumley et al. | 264/257 X |
| 4,609,516 | 9/1986 | Krishnakumer et al. | 264/328.8 X |

Primary Examiner—Robert L. Lindsay
Attorney, Agent, or Firm—Harry J. Gwinnell

[57] ABSTRACT

A method of molding a hollow, fiber reinforced glass matrix composite article. Reinforcing fibers are placed in a mold cavity. A billet of high temperature stable glass matrix material is heated above its flow point. The thus heated matrix materials is flowed into the mold cavity from a point inside of the article being formed and at the relative midpoint along its vertical axis. Improved article tolerance control and minimized article preform fiber disturbance is achieved.

2 Claims, 1 Drawing Sheet

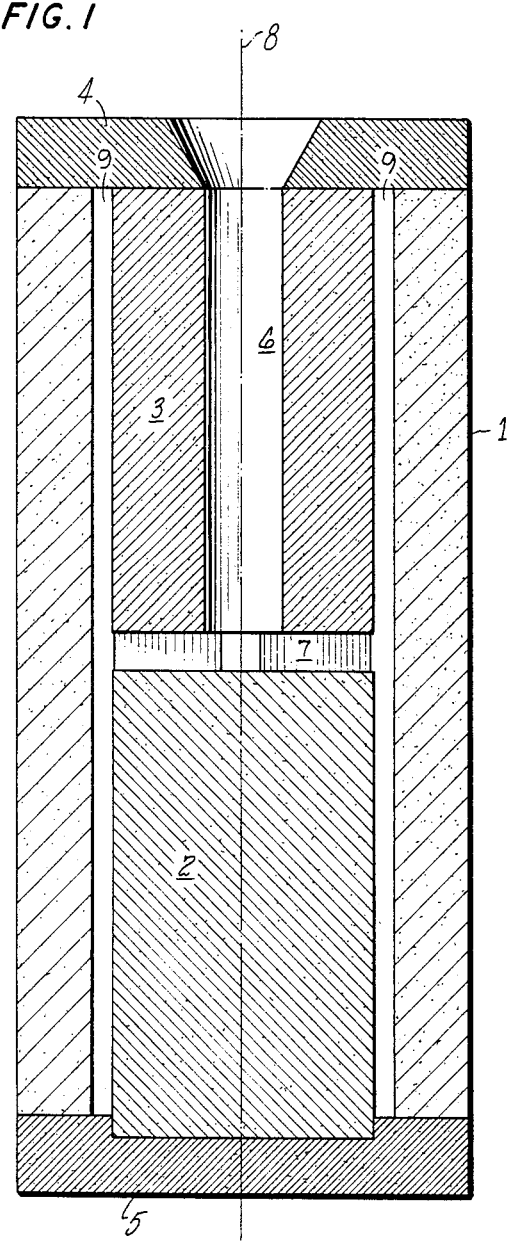
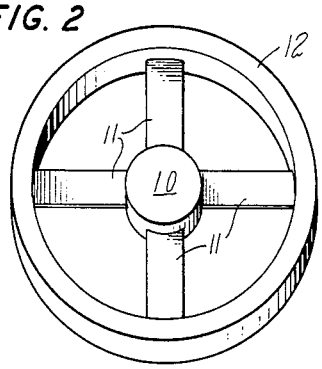
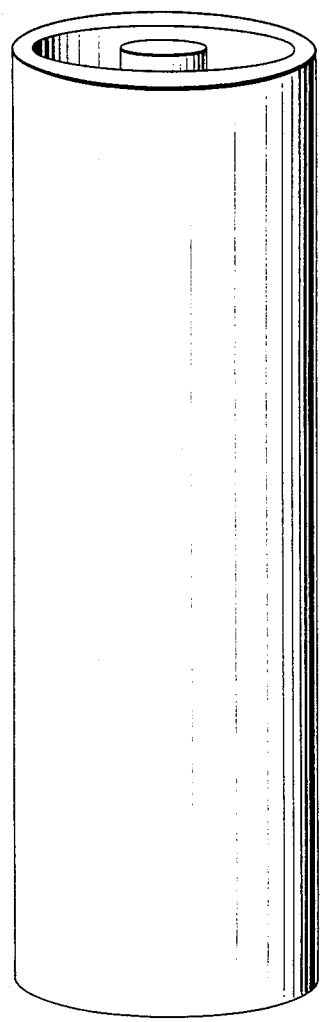

COMPOSITE MOLDING PROCESS

DESCRIPTION

1. Technical Field

The field of art to which this invention pertains is molding, and particularly methods of molding fiber reinforced composite articles.

2. Background Art

Because of the scarcity and increasing expense of many conventional high temperature structural metals, increased attention has focused on non-metal fiber reinforced composites as replacements for conventional high temperature metal alloys. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature.

Ceramic, glass and glass ceramic bodies are known to the art which can be employed in high temperature applications. Unfortunately, however, these bodies frequently lack the mechanical strength desired and are invariably deficient in toughness and impact resistance. This situation has given rise to the preparation of composite bodies consisting of a matrix of ceramic, glass, or glass ceramic material with inorganic fibers dispersed in continuous or discontinuous fashion therein. Henceforth referred to as glass matrix composites, these materials are described in commonly assigned U.S. Pat. Nos. 4,314,852 and 4,324,843 (the disclosures of which are incorporated by reference). Silicon carbide fiber reinforced glass/ceramic composite components prepared according to the teachings of the above-referenced patents exhibit physical properties which permit their utilization in heat engines and other applications to effect significant improvement in performance. Such applications, however, require that novel methods of fabrication be found for the production of complex shaped parts with reinforcing fibers distributed in some instances, for example, in at least three directions to impart improved strength.

Even though great strides have been made in this area, difficulties exist in methods of preparing such improved composite articles. In the past, continuous fiber reinforcement for composite articles has been achieved through the use of collimated fiber tapes, felts and papers which are infiltrated with glass-carrier slurries, cut to size, and oriented and then stacked in a die for hot pressing. However, this procedure is inadequate for all articles. It is also difficult to form cylinders and other complex shapes with such planar type materials.

With current resin matrix composite technology, this shortcoming is overcome through the use of woven fiber strutures. The fibers are woven to make either cloth or actual article shapes. After weaving these articles can be easily infiltrated with resins due to both the very low viscosity achievable with resins prior to their curing, and also the ease with which these resins wet the fibers.

Other methods which have been used to form fiber reinforced glass composite parts are injection molding of heated billets of chopped fibers and glass (note commonly assigned U.S. Pat. No. 4,464,192, the disclosure of which is incorporated by reference) and transfer molding techniques where a glass billet is heated and transferred to a mold lined with fibers in a predetermined shape (note commonly assigned U.S. Pat. No. 4,428,763, the disclosure of which is incorporated by reference). However, because of the high viscosity of the glass and high pressures required by these techniques, shifting and distortion of the reinforcing fibers can occur during processing.

Accordingly, there is a constant search in this art for molding methods which provide improved article quality.

DISCLOSURE OF INVENTION

The present invention is directed to a method of making a hollow, fiber reinforced glass matrix composite article by aligning high temperature stable fibers in a mold cavity in the shape of a hollow composite article preform. A billet of high temperature stable glass matrix material is then heated above its flow point. The thus heated matrix material is next transferred into the mold cavity and around the fibers from a point (or points) both inside the hollow article preform and at the relative midpoint along the vertical access of the article preform. The thus impregnated preform is then cooled to form a hollow composite article. The process results in minimized article preform fiber distortion and improved article tolerance control.

The foregoing, and other features and advantages of the present invention will become more apparent from the following description and accompanying drawings.

BRIEF DESCRIPTION OF DRAWINGS

FIG. 1 shows diagramatically a mold useful with the present invention.

FIG. 2 shows a molded article according to the present invention with mold paths still in place.

FIG. 3 shows an article formed according to the present invention.

BEST MODE FOR CARRYING OUT THE INVENTION

The use of the term "glass matrix material" is meant to include both glass and glass-ceramic materials. As the glass material any silicate glass which will impart high temperature strength properties to composites according to the present invention can be used. Corning 7740 (Corning Glass Works) aluminosilicate glass has been found to be particularly suitable, although both borosilicate glass and high silica content glass are also suitable.

Another attractive matrix material according to the present invention is the glass-ceramic material mentioned above. During molding according to the present invention the glass and glass-ceramic material typically has a viscosity less than about $10^4$ poise. Upon cooling, the glassy matrix and the glass-ceramic material can be converted to the crystalline state, the degree and extent of crystallization being controlled by the matrix composition and heat treatment schedule employed. Note U.S. Pat. No. 4,324,843 mentioned above. While conventional lithium aluminosilicate is the preferred glass ceramic, other conventional glass-ceramics such as aluminosilicate, magnesium-and alumino-silicate, and combinations of the above can be used.

While any high temperature stable fiber reinforcing material wettable by the viscous matrix can be used, silicon carbide fibers are especially preferred. A multi-filament silicon carbide yarn with an average filament diameter of up to 50 microns has been used. Nippon Carbon Company of Japan provides such a yarn with about 250 fibers per tow and an average fiber diameter of about 10 microns. The average strength of the fibers is approximately 2,000 MPa and it has a use temperature up to about 1200° C. The yarn has a density of approximately 2.6 grams per cubic centermeter and an elastic modulus of approximately 221 GPa. Although the particular example below demonstrates a molding process with a woven silicon carbide cloth, the process is equally useful with nonwoven continuous fibers, discontinuous fibers, or combinations of the above.

The mass of the glass billet is generally the same mass as will be required to fully densify the final fiber reinforced article. The billet is heated to a temperature above its working point, i.e. the point at which the glass begins to flow and can be transferred into the mold. Typically, this temperature ranges from about 1000° C. to about 1500° C. Pressures used for transferring the heated billet into the mold cavity are generally in the range of about 100 psi to about 3,000 psi and takes up to about 60 minutes, although higher pressures may be used with tightly woven fiber structures. Fiber loading of the articles generally ranges from about 20% by weight to about 50% by weight.

Although generally the fibers are laid up by hand or by machine in a particular orientation to conform to the shape of the mold cavity, the fibers can be formed into the desired article shape, for example with a polymeric binder. This shape can then be placed in the transfer mold and the glass transfered in and about the fibers susequent to removal of the temporary binder, for example by a preheat burnoff. Typical binders useful in this way are the Carbowax ® series (Union Carbide Corp.) and especially Carbowax 4000, and acrylic resins such as Rhoplex ® (Rohm and Haas Corp.) resins.

As stated above, the fibers are aligned in the mold cavity to provide strength in a particulr direction. For example, for cylindrical shaped articles, fibers would be aligned in a direction around a central tubular mold core (circumferentially) to provide hoop strength, and fibers would be aligned in a direction along the axis of the cylinder (axially) to provide strength along the length of the cylindrical shaped article. Use of a woven material as in the Example below would provide such strength in both these directions. In fact, the use of weaving to provide the strength properties desired in complex shapes such as turbine blades is exemplary of the utility of this process.

EXAMPLE

A cylindrical mold was machined out of commercially available graphite as shown in FIG. 1. The side walls of the mold (1) and central portions of the mold (2 and 3) are constituted so as to result in a cylinder approximately 6 inches long, 2 inches in outer diameter and 0.125 inch thick. The top portions (4) and bottom portions (5) of the mold are also shown. The central portions (2 and 3) of the mold are placed so as to define a channel (6) which allows flow of the matrix material down through the central portion of the mold to a plane (7) approximately midway through the vertical axis (8) of the article height. (Slight variations, e.g. ±10%, from the midway point can be used, although larger variations will result in an inferior product.)

A braided silicon carbide fiber cylindrical preform (not shown) was placed into the mold cavity (9) after which the top (4) and central portions (2 and 3) of the mold were put into place. A slurry containing borosilicate glass was poured into the graphite mold containing the braided silicon fiber preform. Additional glass powder was added in the reservoir above the mold cavity (not shown). The temperature of the mold and reservoir containing the glass matrix material was heated to glass matrix flow temperature.

A single action, controlled atmosphere, vacuum hot press was used to perform the consolidation via the matrix transfer molding method using the following parameters: 1,000 psi (pounds per square inch) pressure from a 3½ inch diameter upper ram heated to 2462° F. for a period of 30 minutes. After transferring the matrix material, the mold was allowed to cool and the article removed. Upon inspection of the article, it was determined that matrix consolidation had taken place with little fiber preform distortion. It was also demonstrated that the above pressing can take place using only hydrostatic pressure via the viscous glass medium and full consolidation can be achieved.

An inspection of FIG. 2 shows the flow path of the matrix material through passageways (10) and (11) into the cylindrical (12). And FIG. 3 shows a finished article formable with the present invention. (It should be noted that the passageways visible in FIG. 2 are easily removed, for example with hammer and chisel or saw).

Typical high temperature stable structural components which can be made with the process according to the present invention are hollow containers and contoured objects such as gas turbine engine blades, burner can segments, hollow air foil vanes, combustion chambers, etc. And, as stated above, the present method provides greater article tolerance control and minimizes article preform fiber distortion.

Although this invention has been shown and described with respect to detailed embodiments thereof, it will be understood by those skilled in the art that various changes in form and detail thereof may be made without departing from the spirit and scope of the claimed invention.

I claim:

1. A method of making hollow, fiber reinforced glass matrix composite article comprising aligning high temperature stable fibers in a mold cavity in a shape of a hollow composite article preform, heating a billet of high temperature stable glass matrix material above its flow point, transferring the thus heated matrix material into the mold cavity and around the fibers using pressure, cooling the fiber reinforced matrix material to form a hollow composite article, wherein the improvement comprises introducing the matrix material into the mold cavity from at least one point both inside the hollow article preform and at the relative midpoint along the vertical axis of the article, resulting in improved article tolerance control and minimized article preform distortion.

2. The method of claim 1 wherein the fibers are selected from the group consisting of woven fibers, nonwoven fibers, continuous length fibers, discontinuous length fibers, and mixtures thereof.

* * * * *